United States Patent
Fetterman et al.

(10) Patent No.: US 10,359,504 B2
(45) Date of Patent: Jul. 23, 2019

(54) APPARATUS AND METHOD FOR MITIGATING INTERFERENCE IN AN AUTOMOTIVE RADAR SYSTEM

(71) Applicant: Veoneer US, Inc., Southfield, MI (US)

(72) Inventors: Matthew Fetterman, Waltham, MA (US); Jonathan Moss, Haimhausen (DE); Aret Carlsen, Groton, MA (US); Andreas Lefevre, Euerdorf (DE)

(73) Assignee: Veoneer US, Inc., Southfield, MI (US)

( * ) Notice: Subject to any disclaimer, the term of this patent is extended or adjusted under 35 U.S.C. 154(b) by 328 days.

(21) Appl. No.: 15/282,451

(22) Filed: Sep. 30, 2016

(65) Prior Publication Data

US 2018/0095162 A1    Apr. 5, 2018

(51) Int. Cl.
| | |
|---|---|
| *G01S 13/93* | (2006.01) |
| *G01S 7/02* | (2006.01) |
| *G01S 13/34* | (2006.01) |
| *G01S 13/87* | (2006.01) |
| *G01S 7/35* | (2006.01) |

(52) U.S. Cl.
CPC ............ *G01S 7/023* (2013.01); *G01S 13/343* (2013.01); *G01S 13/87* (2013.01); *G01S 13/931* (2013.01); *G01S 13/345* (2013.01); *G01S 2007/356* (2013.01); *G01S 2013/9375* (2013.01); *G01S 2013/9378* (2013.01)

(58) Field of Classification Search
CPC ...... G01S 13/343; G01S 13/345; G01S 13/87; G01S 13/931; G01S 2007/356; G01S 2013/9375; G01S 2013/9378; G01S 7/023

USPC .......................................................... 342/16
See application file for complete search history.

(56) References Cited

U.S. PATENT DOCUMENTS

| | | | |
|---|---|---|---|
| 6,822,605 B2 | 11/2004 | Brosche | |
| 8,390,506 B2 | 3/2013 | Focke et al. | |
| 9,182,476 B2 | 11/2015 | Wintermantel | |
| 2004/0257266 A1* | 12/2004 | Pleva ................. | B60K 31/0008 342/70 |
| 2011/0122014 A1 | 5/2011 | Szajnowski | |
| 2012/0169523 A1 | 7/2012 | Lee et al. | |
| 2013/0128927 A1 | 5/2013 | Yucek | |
| 2016/0109571 A1* | 4/2016 | Zeng ...................... | G01S 13/87 342/71 |

OTHER PUBLICATIONS

International Search Report in corresponding International Application No. PCT/US17/48433, dated Nov. 20, 2017; 2 pages.

* cited by examiner

*Primary Examiner* — Timothy A Brainard
(74) *Attorney, Agent, or Firm* — Burns & Levinson LLP; Steven M. Mills (57) ABSTRACT

A system and method for mitigating interference in a frequency-modulated continuous-wave radar processing system is defined. Random inter-pulse jitter is implemented in a transmitted radar signal to prevent identification of false tracks due to interfering radar signals. Random intra-pulse jitter of time and/or frequency is implanted to create spreading of false targets and provide a method to distinguish false targets from true targets. Adjacent sensors in a multi-sensor radar system are alternatingly configured to transmit either upward ramping or downward ramping frequencies to mitigate interference between adjacent sensors in the same radar system.

20 Claims, 7 Drawing Sheets

APPARATUS AND METHOD FOR MITIGATING INTERFERENCE IN AN AUTOMOTIVE RADAR SYSTEM

BACKGROUND

1. Technical Field

The present disclosure is related to automotive radar systems and, in particular, to an apparatus and method for substantially reducing or eliminating interference in a frequency-modulated continuous-wave (FMCW) automotive radar system.

2. Discussion of Related Art

In automotive radar systems, multiple radar sensors can be mounted to the host vehicle. Each radar sensor includes a transmitter for transmitting radar signals into a region of interest adjacent to the vehicle and a receiver for receiving return radar signals from objects in the region of interest. Processing circuitry in each sensor processes the received return radar signals to detect objects and determine range, bearing and/or velocity of the objects.

Because automotive radar systems can typically include multiple sensors operating on the same host vehicle, sensors can interfere with each other. That is, radar return signals received by the receiver of a first sensor can be affected by the radar signals transmitted by another sensor on the same vehicle. Similarly, the radar return signals received by the receiver of each sensor on the vehicle can be affected by the radar signals transmitted by another sensor on another vehicle. The radar system performance is typically characterized based on the ability of the system to detect objects and correctly determine their range, bearing and Doppler velocity. The radar processing of the system with the effects of this interference can adversely affect the detection performance of each sensor and the radar system in which the sensors are operating.

SUMMARY

According to an aspect of the present disclosure, an automotive radar system includes at least one first signal transmitter for transmitting a first type of transmitted signal into a region and at least one first waveform generator for controlling a waveform of the first type of transmitted signal. The waveform of the first type of transmitted signal includes a train of pulses, each pulse being separated in time by a pulse separation time. Each pulse includes a series of chirps. The frequencies of each chirp vary according to a substantially linear sloped ramp of frequency versus time. The first waveform generator(s) control the waveform such that the pulse separation time between at least two pulses is varied randomly and a range of frequencies in at least one chirp is varied randomly. The automotive radar system also includes a receiver for receiving a reflected signal generated by reflection of the transmitted signal from an object and generating a receive signal from the reflected signal, and a processor for receiving the receive signal and processing the receive signal to generate radar information for the region.

In some embodiments, according to this aspect, the automotive radar system also includes at least one second transmitter for transmitting a second type of transmitted signal into the region and at least one second waveform generator for controlling a second waveform of the second type of transmitted signal. The second waveform of the second type of transmitted signal comprises a second train of pulses, each pulse of the second train of pulses being separated in time by a second pulse separation time. Each pulse of the second train of pulses includes a second series of chirps, frequencies of chirps in the second series of chirps vary according to a substantially linear sloped ramp of frequency versus time. The first waveform generator(s) controls the first waveform(s) of the first type of transmitted signal(s) such that the frequencies of each chirp of the series of chirps in the first type of transmitted signal(s) vary one of directly and inversely with time. The second waveform generator(s) controls the second waveform(s) of the second transmitted signal(s) such that the frequencies of each chirp of the second series of chirps vary the other of directly and inversely with time.

In some embodiments according to this aspect of the present disclosure, the first transmitter(s) and the second transmitter(s) are mounted around a vehicle in an alternating pattern such that each first transmitter is adjacent to a second transmitter and not adjacent to another first transmitter.

BRIEF DESCRIPTION OF THE DRAWINGS

The present disclosure is further described in the detailed description which follows, in reference to the noted plurality of drawings by way of non-limiting examples of embodiments of the present disclosure, in which like reference numerals represent similar parts throughout the several views of the drawings.

DETAILED DESCRIPTION

Figure 1:
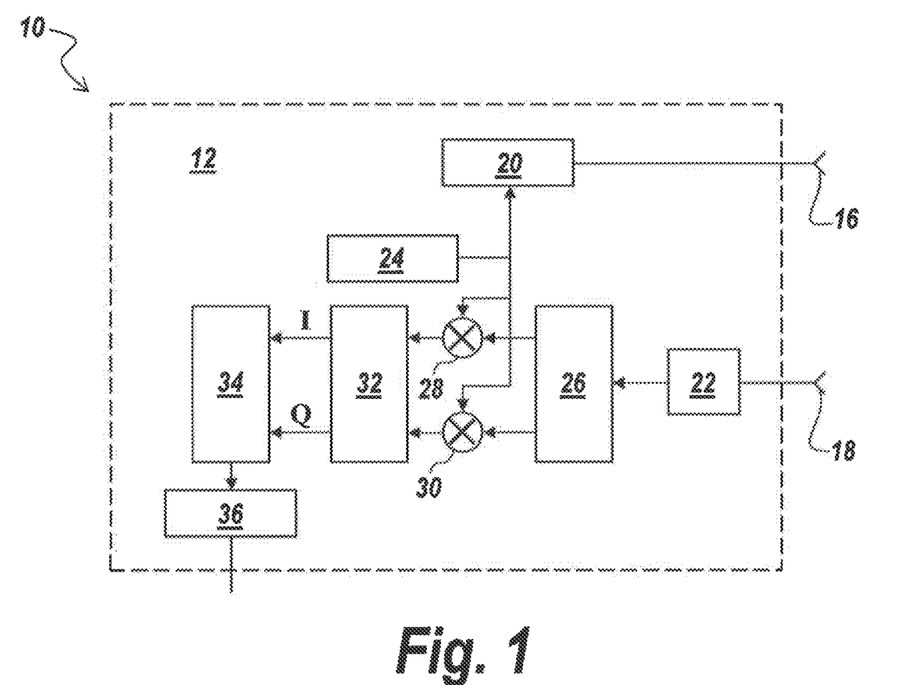
FIG. 1 includes a schematic block diagram of an automotive radar system, including one or more radar sensor modules for processing automotive radar signals, in accordance with exemplary embodiments.

According to the exemplary embodiments of the present disclosure, provided is an automotive radar system and automotive radar sensor and radar processing methods in which the undesirable effects of interference from other radar sensors are substantially reduced or eliminated. FIG. 1 includes a schematic block diagram of an automotive radar system 10, including one or more radar sensor modules 12 for processing automotive radar signals, in accordance with some exemplary embodiments. Referring to FIG. 1, radar system 10 includes one or more radar modules 12, which process radar transmit and receive signals which are compatible with radar system 10 in the host vehicle. Radar sensor module 12 generates and transmits radar signals into the region of interest adjacent to the host vehicle that is being monitored by the radar system. Generation and transmission of signals is accomplished by RF signal generator 24, radar transmit circuitry 20 and transmit antenna 16. Radar transmit circuitry 20 generally includes any circuitry required to generate the signals transmitted via transmit antenna 16, such as signal shaping/timing circuitry, transmit trigger circuitry, RF switch circuitry, RF power amplifier circuitry, or any other appropriate transmit circuitry used by radar system 10 to generate the transmitted radar signal according to exemplary embodiments described in detail herein.

Radar module 12 also receives returning radar signals at radar receive circuitry 22 via receive antenna 18. Radar receive circuitry 22 generally includes any circuitry required to process the signals received via receive antenna 18, such as RF low noise amplifier circuitry, signal shaping/timing circuitry, receive trigger circuitry, RF switch circuitry, or any other appropriate receive circuitry used by radar system 10. In some exemplary embodiments, the received signals processed by radar receive circuitry 22 are forwarded to phase shifter circuitry 26, which generates two signals having a predetermined phase difference. These two signals, referred to as an inphase (I) signal and a quadrature (Q) signal, are mixed with an RF signal from RF signal generator 24 by mixers 28 and 30, respectively, to generate I and Q intermediate frequency (IF) signals. The resulting IF signals are further filtered as required by filtering circuitry 32 to generate filtered IF I and Q signals, labeled "I" and "Q" in FIG. 1. The IF I and Q signals are digitized by analog-to-digital converter circuitry (ADC) 34. These digitized I and Q IF signals are processed by a processor, such as a digital signal processor (DSP) 36. In some exemplary embodiments, the DSP 36 can perform all of the processing required to carry out the object detection and parameter determination, including object range, bearing and/or velocity determinations, performed by system 10.

It will be understood that the system configuration illustrated in FIG. 1 is exemplary only and that other system configurations can be used to implement the embodiments described herein. For example, the ordering of filtering of the IF signal and analog-to-digital conversion may be different than the order illustrated in FIG. 1. The IF signal may be digitized before filtering, and then digital filtering may be carried out on the digitized signal(s).

Figure 2:
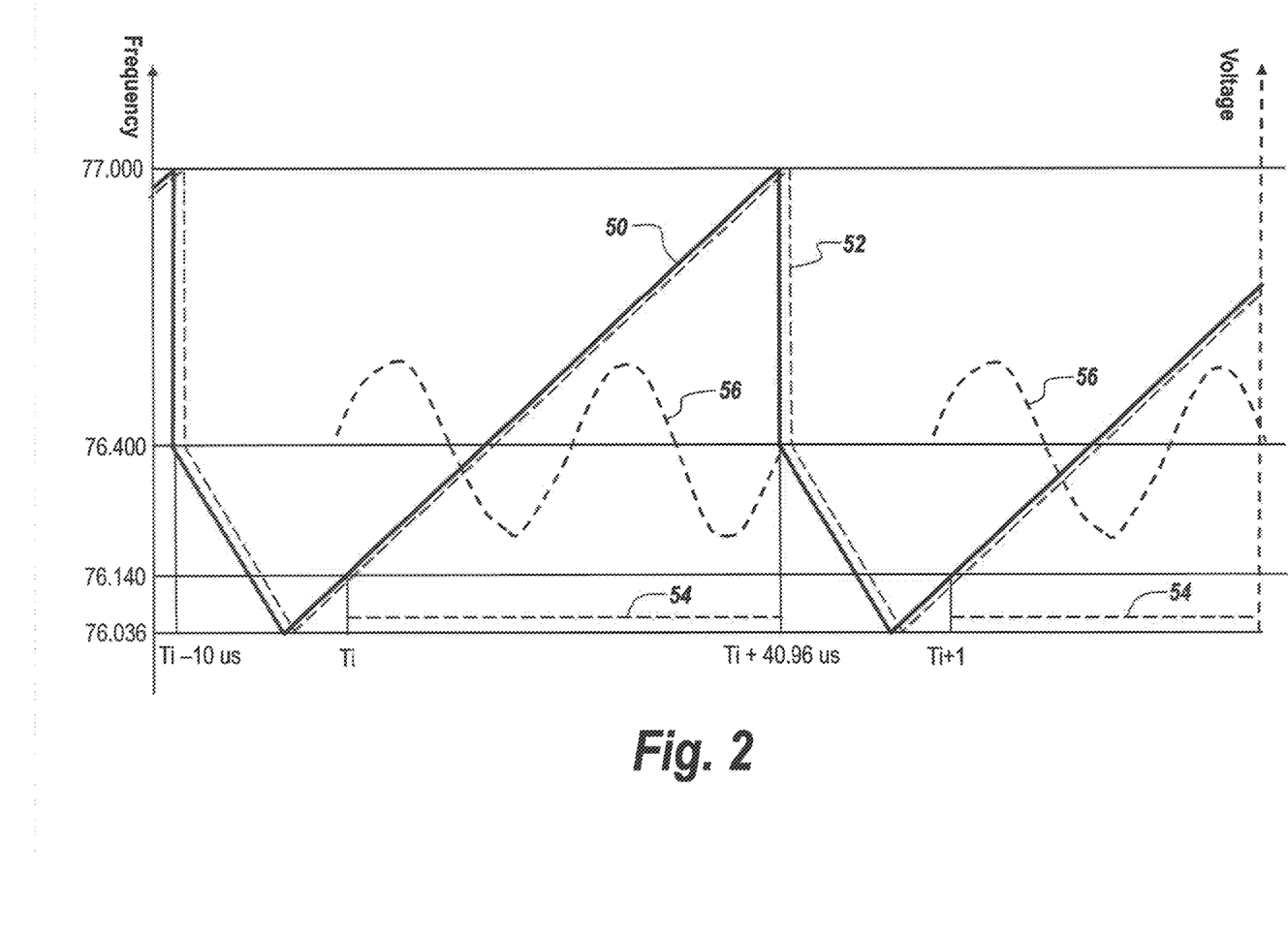
FIG. 2 includes a schematic timing diagram of signals in a conventional FMCW radar system.

According to the present disclosure, in a FMCW radar system, radar signals are transmitted into the region of interest in the form of continuous wave having a changing frequency. FIG. 2 includes a schematic timing diagram of signals in a conventional FMCW radar system. Referring to FIG. 2, transmitted radar signal 50, illustrated in a solid bold line, and the corresponding received radar signal 52, illustrated as a dashed bold line, are plotted as frequency vs. time. Curve 54 is a graph of the frequency of the IF signal, versus time. As shown in FIG. 2, the frequency of the IF signal $F_{IF}$ is the magnitude of the difference between the frequency of the transmitted signal $F_{TX}$ and the frequency of the received signal $F_{RX}$, i.e., $F_{IF}=|F_{TX}-F_{RX}|$. The IF output waveform is illustrated in curve 56 as voltage amplitude vs. time, superimposed in FIG. 2 over the frequency curves 50, 52, 54.

Referring to FIG. 2, in a conventional FMCW automotive radar system, radar signals are transmitted with a periodic linearly ramped frequency, as illustrated by curve 50. As a result, in the ideal case, a similarly linearly ramped return signal is received, shifted in time, as illustrated by curve 52. The frequency of the resulting IF signal is the difference between the frequencies of the two curves 50 and 52, which in the illustrated case is a constant. It is this IF waveform 56 that is processed to make radar detections and parameter determinations for objects in the region of interest.

In the particular exemplary waveforms illustrated in FIG. 2, the time of each linear frequency ramp is identified as $T_i$, where i is the index or number of the particular ramp. In the particular illustrations shown in FIG. 2, the period of each ramp cycle is approximately 50.96 μsec. The frequency of a transmitted radar signal in each ramp cycle increases linearly from approximately 76.036 GHz to approximately 77.000 GHz and then decreases rapidly through approximately 76.400 GHz and then slightly less rapidly back to the starting frequency of the next cycle at 76.036 GHz. The start of a first linear frequency ramp is illustrated to being at time $T_i$, and the start of the next cycle is illustrated to begin at time $T_{i+1}$. It will be understood that these particular parameters of the frequency ramp described herein are exemplary only. The present disclosure is applicable to any sets of parameters of the frequency ramps.

As indicated above, the timing diagram of FIG. 2 illustrates the ideal case in which the received return signal 52 is due entirely to reflections of the transmitted signal 50 from objects in the region of interest. In this case, processing of the resulting IF signal 56 results in accurate object detection and parameter determination. However, in actuality, the actual received signal may be influenced by other effects, which include interference caused by reflections of radar signals transmitted by transmitters of other radar sensors, either within or external to the same radar system. As a result, the IF signal processed to make object detections and parameter determinations includes extraneous information, which results in decreased system performance.

Referring to FIG. 2, in a conventional FMCW automotive radar system, radar signals are transmitted with a periodic linearly ramped frequency, as illustrated by curve 50. As a result, in the ideal case, a similarly linearly ramped return signal is received, shifted in time, as illustrated by curve 52. The frequency of the resulting IF signal is the difference between the frequencies of the two curves 50 and 52, which in the illustrated case is a constant. It is this IF waveform 56 that is processed to make radar detections and parameter determinations for objects in the region of interest.

Figure 3:
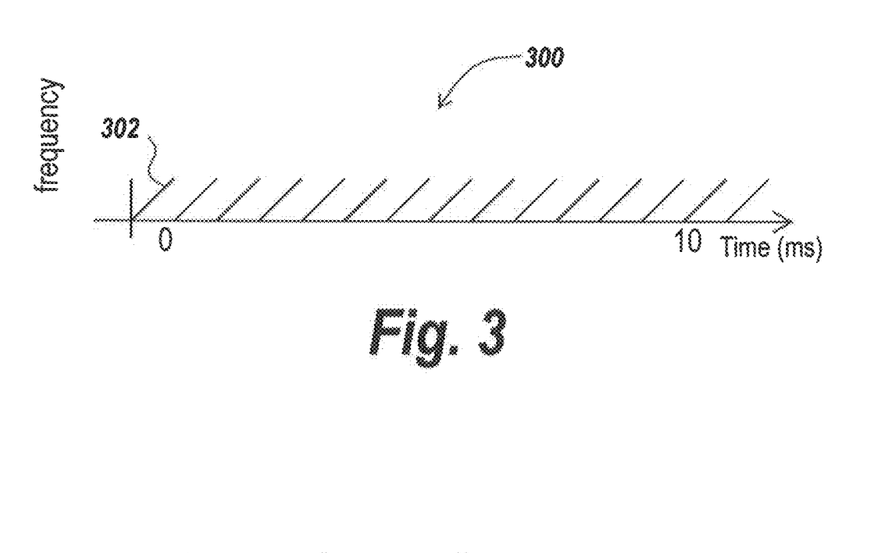
FIG. 3 includes a schematic timing diagram illustrating aspects of a transmitted radar signal in a conventional FMCW automotive radar system.
Figure 4:
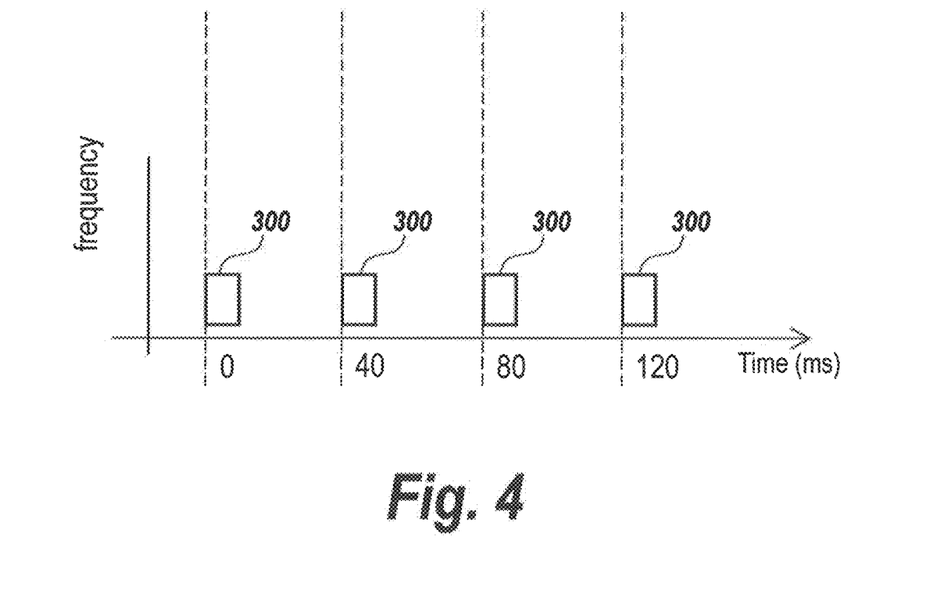
FIG. 4 includes a schematic timing diagram illustrating aspects of a transmitted radar signal in a conventional FMCW automotive radar system.

Referring to FIG. 3, in a conventional FMCW automotive radar system, a pulse of transmitted radar signals 300 includes a series of chirps 302, wherein each chirp has periodic linearly ramped frequency. Each chirp has a ramp which lasts 41 microseconds. Referring to FIG. 4, in an illustrative embodiment, the chirps are transmitted in a train of pulses 300 in which pulses are transmitted every 40 milliseconds. Each pulse 300 includes 128 chirps. The total transmission time for each pulse is 6.5 milliseconds.

Figure 5:
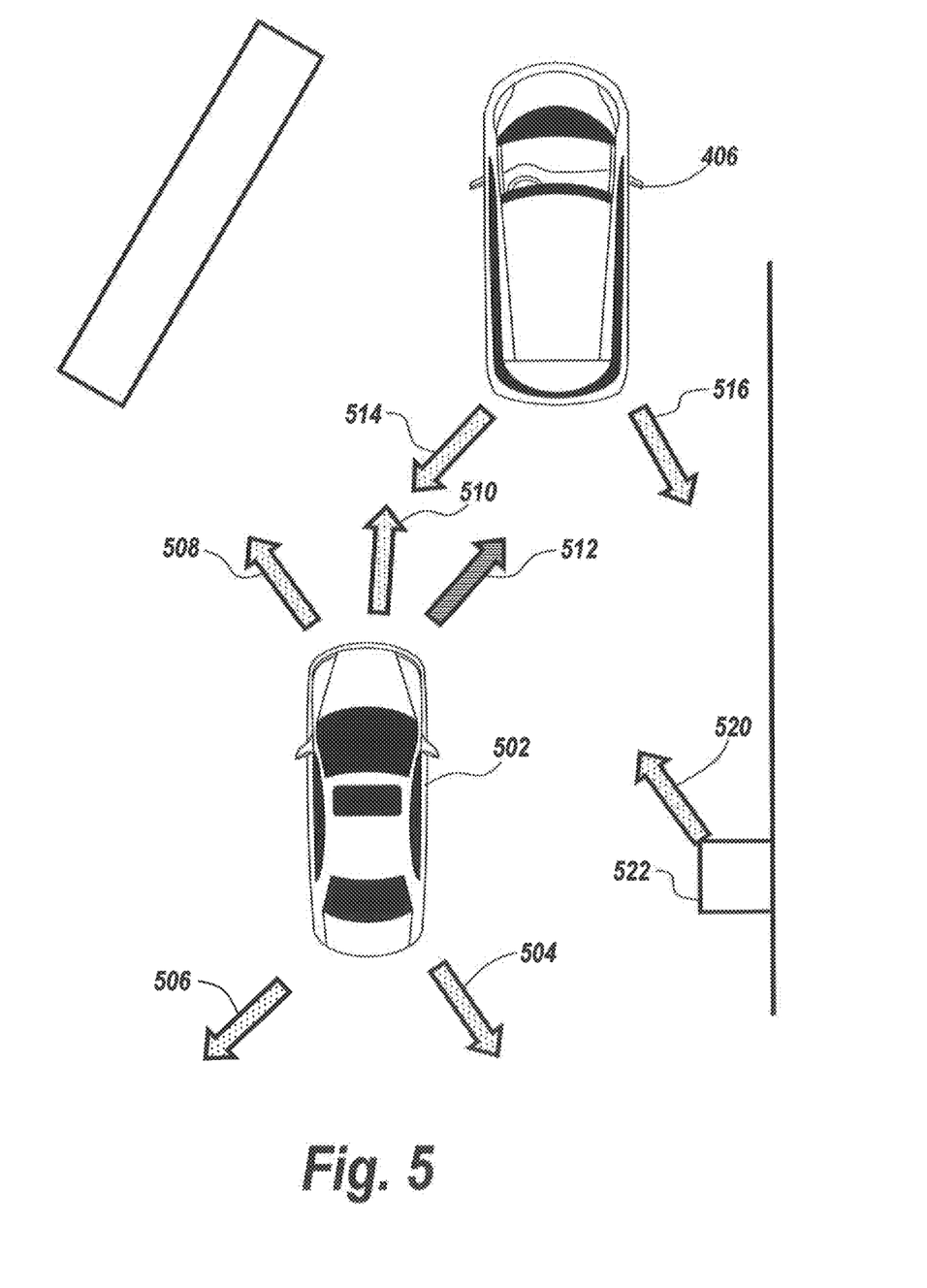
FIG. 5 includes an illustration showing interfering radar signals in an implementation of an automotive radar system.

In automotive implementations of FMCW radar systems, interference of radar signals is particularly problematic. Automotive radar systems may include numerous sensors mounted on a vehicle. Similar automotive radar systems may also be installed on a large number of nearby vehicles. Referring to FIG. 5, for example, a first vehicle 502 may have numerous radar sensors transmitting similar radar signals 504, 506, 508, 510, 512 in different fixed directions relative to the first vehicle 502. A second vehicle 518 nearby may also have numerous radar sensor transmitting radar signals 514, 516. Other radar signals 520 may be transmitted from radar systems mounted nearby on stationary structures 522, for example. Each of the sensors transmits a radar signal and ideally receives reflected returns of its own signal. However in an automotive radar environment, where a large number of radar sensors transmit similar radar signals, each sensor may also receive interfering signals such as direct or reflected signals from other sensors. Interference may occur between similar radar sensors mounted on a vehicle. For example, a first sensor which emits a first radar signal 512 from the first vehicle 502 may receive a reflection of a second radar 510, which was emitted by a second sensor on the first vehicle 502. Interference may also occur between similar radar sensors mounted on different vehicles. For example, the first sensor which emits the first radar signal 512 from the first vehicle 502 may directly receive a third radar signal 514 being emitted by a senor on the second vehicle 518. Interference may also occur between sensors mounted on a vehicle and other emission sources mounted on different vehicles or on stationary structures. For example, the first sensor which emits the first radar signal 512 from the first vehicle 502 may receive a fourth radar signal 520 emitted from a radar sensor mounted on a stationary structure 522, either directly or as a reflection of the fourth radar signal 520 from an vehicle or stationary object.

In automotive radar systems interference can degrade radar performance by saturating radar receiving and processing circuitry in a sensor and by degrading the signal to noise ratio in a sensor, for example. Some types of interfering signals can also be mistaken by a sensor as reflections of its own transmitted radar signals. This can cause a sensor to indicate a false target. If the interference causing the false target indication persists over several radar cycles, the sensor may identify a false track. In automotive radar applications, false targets and false track indications are serious hazards because they may lead to erroneous braking or firing of a vehicle's airbag, for example.

Figure 6:
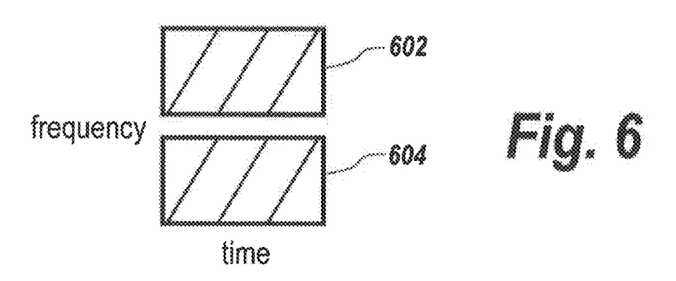
FIG. 6 includes a schematic timing diagram of a radar signal illustrating a first type of interference in an automotive radar system.

Referring to FIG. 6, a first type of interference, herein called Type 1 interference, can occur in a source sensor when a source pulse 602 transmitted by the source sensor has a waveform identical with an interfering pulse 604 transmitted by some other nearby sensor and the source pulse 602 is precisely aligned in time with the interfering pulse 604. Because the source pulse 602 is indistinguishable from the interfering pulse 604, Type 1 interference is difficult to detect and mitigate. This type of interference causes the source sensor to identify false targets and false tracks. Type 1 interference is likely to occur between sensors in radar systems having multiple sensors with precise synchronized timing, such as in master-slave systems, for example. In such systems, ramps from one sensor on a vehicle can maintain synchronous timing with ramps from another sensor on the vehicle.

Figure 7:
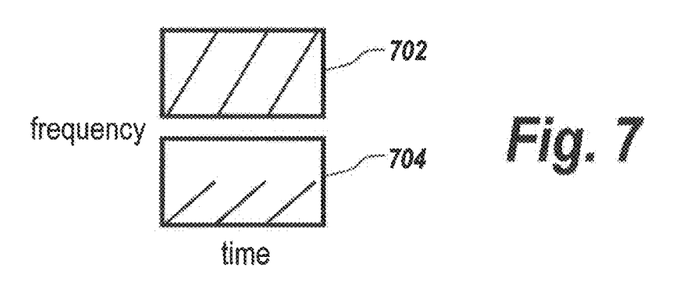
FIG. 7 includes a schematic timing diagram of a radar signal illustrating a second type of interference in an automotive radar system.

Referring to FIG. 7, a second type of interference, herein called Type 2 interference, can occur in the source sensor when a source pulse 702 transmitted by the source sensor has a waveform similar, but not identical, to an interfering pulse transmitted by some other nearby sensor, and the source pulse 702 is precisely aligned in time with the interfering pulse 704. Type 2 interference is likely to occur between sensors in radar systems having multiple sensors in which different sensors are precisely synchronized in time and transmit similar but not identical waveforms. For example, a multi-mode radar system in a vehicle may transmit a mid-range (MR) mode waveform and a short-range (SR) mode waveform having a different bandwidth than the MR mode waveform. In certain instances, the SR mode waveform may be precisely aligned in time with the MR mode waveform. For example, a sensor transmitting the MR mode waveform may be configured in a master-slave configuration with the sensor transmitting the SR mode waveform so that transmission times of both waveforms are precisely aligned with each other causing type 2 interference. Type 2 interference has a lower probability of producing false targets because the signal is smeared in range.

Aspects of the present disclosure modify the radar waveforms emitted by sensors in a manner that substantially reduces these detrimental and hazardous effects of interference in automotive radar systems. According to aspects of the present disclosure a radar waveform is generated that includes one or more interference mitigating attributes. A first interference mitigating attribute disclosed herein includes random inter-pulse jitter in a radar signal transmitted by a radar sensor. A second interference mitigating attribute disclosed herein includes alternating direction of ramps in a radar signal transmitted by a radar sensor based on the position and/or orientation of the radar sensor on a vehicle. A third interference mitigating attribute disclosed herein includes intra-pulse jitter in a radar signal transmitted by a radar sensor.

Figure 8:
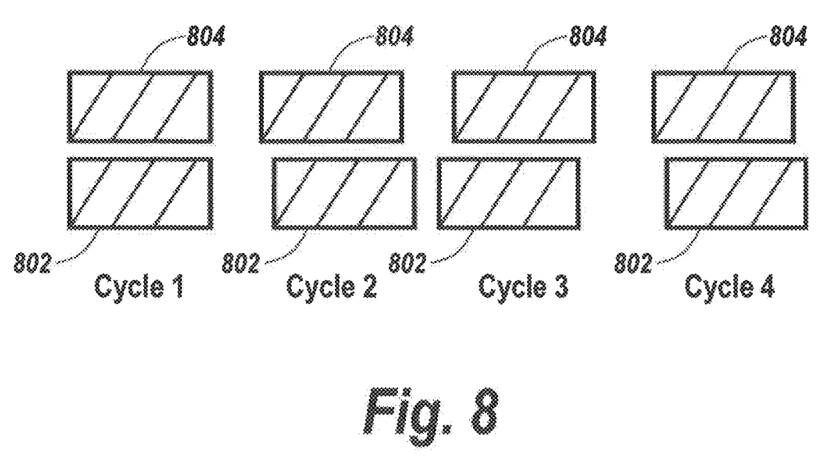
FIG. 8 includes a schematic timing diagram of a radar signal that includes random inter-pulse jitter according to an aspect of the present disclosure.

The first interference mitigating attribute disclosed herein is described with reference to FIG. 8. According to this aspect of the present disclosure, a random timing change is imposed on the start of each source pulse 802 transmitted by a radar sensor. The random timing change causes each source pulse to be shifted in time by a random amount relative to conventional pulses 804 and relative to other randomly shifted pulses transmitted by a nearby interfering source. Interfering conventional pulses 804 and other randomly shifted interfering pulses may be identified as targets by the source radar sensor, but can be recognized as false targets due to their random shifting in time from pulse to pulse. In contrast, reflections of each source pulse 802 received from by the source sensor, are not shifted randomly from pulse to pulse relative to their own source pulses, and therefore can be identified as true targets. The random inter-pulse jitter of a transmitted radar signal according to this aspect of the present disclosure does not prevent false targets but prevents false targets from forming tracks.

Figure 9:
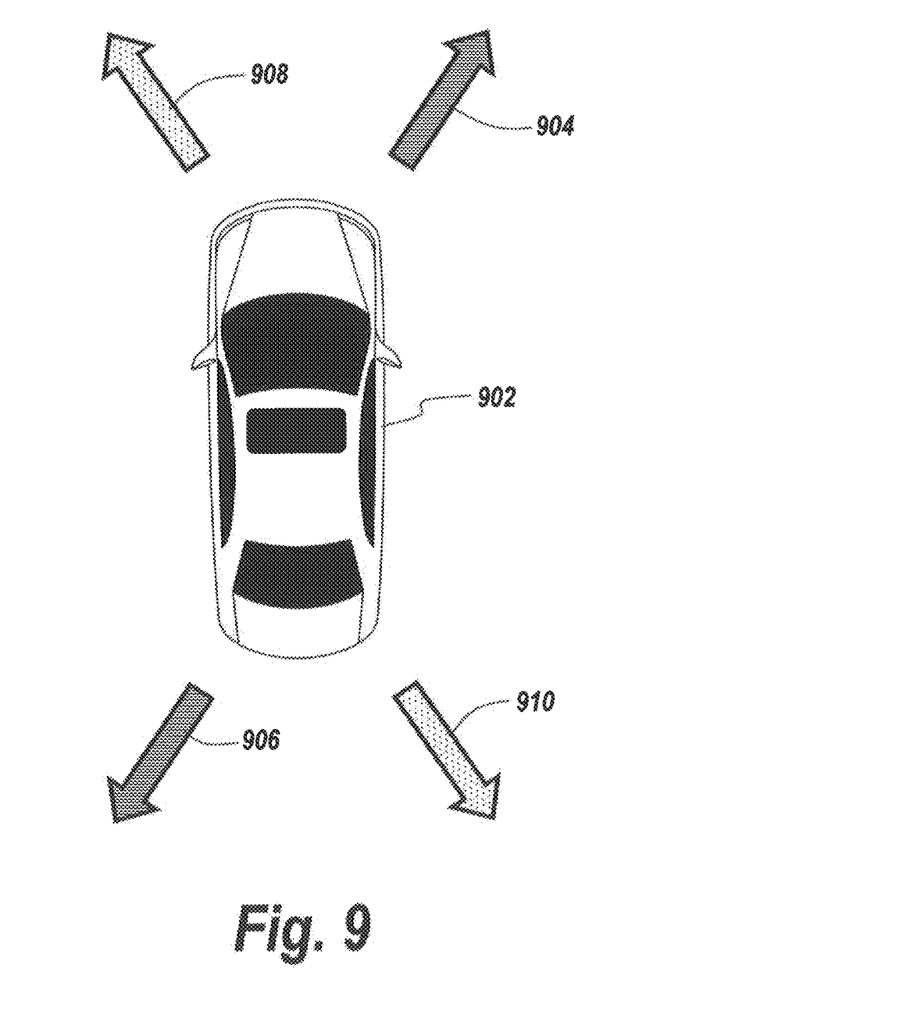
FIG. 9 includes an illustration showing alternating configuration of up-ramp and down-ramp sensor types of an automotive radar system according to an aspect of the present disclosure.

The second mitigating attribute disclosed herein is described with reference to FIG. 9. According to this aspect of the present disclosure, the direction of ramps in a transmitted radar signal is selected based on the position and/or orientation of the source radar sensor on a vehicle 902. In a particular embodiment, radar sensors mounted around the vehicle 902 alternate between sensors that emit up-ramp signals 904, 906, in which the radar signal frequency ramps linearly from a lower frequency to a higher frequency, and sensors that emit down-ramp signals 908, 910, in which the radar signal frequency ramps linearly from a higher frequency to a lower frequency. Interfering up-ramp signals and down-ramp signals may still be aligned in time, but will cause only type 2 interference because the interfering waveforms are not identical to source waveforms. The type 2 interference may create false targets that can be identified as false targets because they are spread in range.

Figure 10:
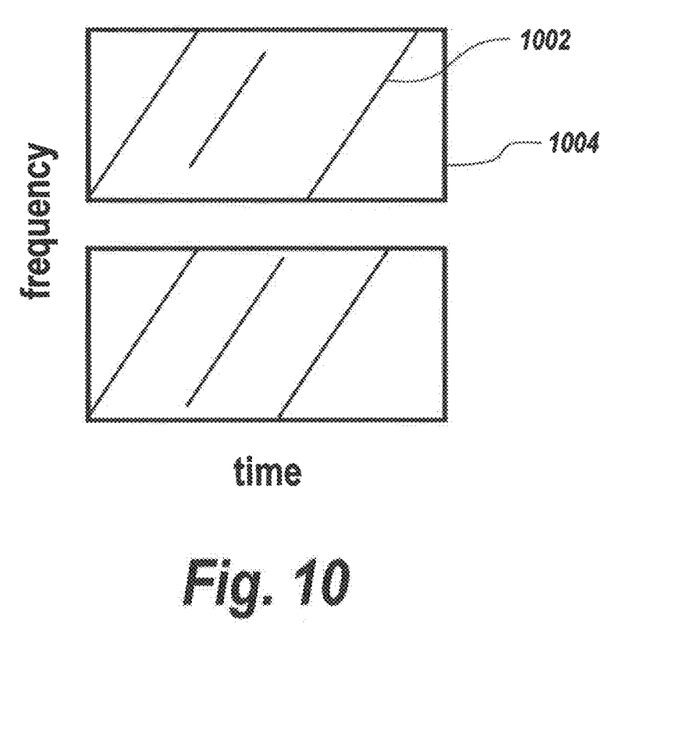
FIG. 10 includes a schematic timing diagram of a radar signal that includes random intra-pulse jitter according to an aspect of the present disclosure.

The third mitigating attribute disclosed herein is described with reference to FIG. 10. According to this aspect of the present disclosure, a small frequency change is imposed on each ramp 1002 within a pulse 1004. The frequency of each ramp 1002 is changed by an amount small enough to avoid substantially changing an apparent target range. This causes interfering ramps 1006 to have random relative phase angles and spreads false targets in their Doppler velocity. According to another aspect of the present disclosure, with regard to the third mitigating attribute, the transmitted phase of each ramp 1002 within a pulse 1004 may be randomly varied.

According to another aspect of the present disclosure radar system includes at least one first signal transmitter for transmitting a first type transmitted signal into a region and at least one waveform generator for controlling a waveform of the first type of transmitted signal(s) such that the waveform of the first type of transmitted signal(s) comprises a train of pulses, each pulse being separated in time by a pulse separation time. Each pulse includes a plurality of chirps. Frequencies of each chirp vary according to a predetermined function of frequency versus time. According to this aspect, the waveform generator controls the waveform such that the pulse separation time between at least two pulses is varied randomly. The radar system also includes a receiver for receiving a reflected signal generated by reflection of the transmitted signal from an object and for generating a receive signal from the reflected signal, and a processor for receiving the receive signal and processing the receive signal to generate radar information for the region.

In some embodiments, according to this aspect of the present disclosure, the radar system also includes at least one second transmitter for transmitting a second type of transmitted signal into the region and at least one second waveform generator for controlling a second waveform of the second type of transmitted signal(s) such that the second waveform of the second type of transmitted signal(s) comprises a second plurality of pulses. Each pulse of the second plurality of pulses is separated in time by a second pulse separation time. Each pulse of the second plurality of pulses comprising a second plurality of chirps, frequencies of chirps of the second plurality of chirps varying according to the predetermined function of frequency versus time. The first waveform generator(s) controls the first waveform of the first type of transmitted signal such that the frequencies of each chirp of the plurality of chirps vary one of directly and inversely with time, and the second waveform generator(s) controls the second waveform of the second type of transmitted signal such that the frequencies of each chirp of the second plurality of chirps vary the other of directly and inversely with time.

In some embodiments, according to this aspect of the present disclosure, the radar system is an automotive radar system and the first transmitter(s) and second transmitter(s) are mounted around a vehicle in an alternating pattern such that each first transmitter is adjacent to a second transmitter and not adjacent to another first transmitter.

In some embodiments according to this aspect, the predetermined function is a substantially linear sloped ramp function of frequency versus time.

According to another aspect of the present disclosure, a radar system includes at least one first signal transmitter for transmitting a first type of transmitted signal into a region and at least one waveform generator for controlling a waveform of the first type of transmitted signal(s) such that the waveform of the first type of transmitted signal(s) comprises a train of pulses. Each pulse is separated in time by a pulse separation time. Each pulse includes a series of chirps. Frequencies of each chirp varying according to a predetermined function of frequency versus time. According to this aspect, the waveform generator controls the waveform such that a range of frequencies in at least one chirp is varied randomly. The radar system also includes a receiver for receiving a reflected signal generated by reflection of the transmitted signal from an object and for generating a receive signal from the reflected signal, and a processor for receiving the receive signal and processing the receive signal to generate radar information for the region.

In some embodiments, according to this aspect of the present disclosure, the radar system also includes at least one second transmitter for transmitting a second type of transmitted signal into the region, and at least one second waveform generator for controlling a second waveform of the second type of transmitted signal(s) such that the second waveform of the second type of transmitted signal(s) comprises a second train of pulses. Each pulse of the second train of pulses is separated in time by a second pulse separation time. Each pulse of the second plurality of pulses includes a second series of chirps. Frequencies of chirps of the second series of chirps vary according to the predetermined function of frequency versus time. The first waveform generator(s) controls the first waveform of the first type of transmitted signal such that the frequencies of each chirp of the series of chirps vary one of directly and inversely with time. The second waveform generator(s) controls the second waveform of the second type of transmitted signal such that the frequencies of each chirp of the second plurality of chirps vary the other of directly and inversely with time.

In some embodiments, according to this aspect, the radar system is an automotive radar system and the first transmitter(s) and second transmitter(s) are mounted around a vehicle in an alternating pattern such that each first transmitter is adjacent to a second transmitter and not adjacent to another first transmitter.

In some embodiments, according to this aspect, the predetermined function is a substantially linear sloped ramp function of frequency versus time.

According to another aspect of the present disclosure, a radar processing method in a frequency-modulated continuous-wave (FMCW) radar system includes steps of transmitting a first type of transmitted signal into a region and controlling a waveform of the first type of transmitted signal such that the waveform of the first type of transmitted signal comprises a train of pulses. Each pulse is separated in time by a pulse separation time. Each pulse includes a series of chirps. Frequencies of each chirp vary according to a substantially linear sloped ramp of frequency versus time. According to this aspect, the pulse separation time between at least two pulses is varied randomly and a range of frequencies in at least one chirp is varied randomly. The method also includes steps of receiving a reflected signal generated by reflection of the transmitted signal from an object and generating a receive signal from the reflected signal, and receiving the receive signal and processing the receive signal to generate radar information for the region.

In some embodiments, according to this aspect of the present disclosure, the radar processing method also includes steps of transmitting a second type of transmitted signal into the region, and controlling a second waveform of the second type transmitted signal such that the second waveform of the second type of transmitted signal includes a second train of pulses. Each pulse of the second train of pulses is separated in time by a second pulse separation time. Each pulse of the second plurality of pulses includes a second series of chirps. Frequencies of chirps of the second plurality of chirps vary according to a substantially linear sloped ramp of frequency versus time. The frequencies of each chirp of the plurality of chirps vary one of directly and inversely with time. The frequencies of each chirp of the second plurality of chirps vary the other of directly and inversely with time.

In some embodiments, according to this aspect of the present disclosure, the radar processing method includes steps of transmitting the first type of transmitted signal from at least one first transmitter on a vehicle, and transmitting the second type of transmitted signal from at least one second transmitter on a vehicle, wherein the first transmitter(s) and the second transmitter(s) are mounted around a vehicle in an alternating pattern such that each first transmitter is adjacent to a second transmitter and not adjacent to another first transmitter.

A radar processing method, according to another aspect of the present disclosure includes steps of transmitting a first type transmitted signal into a region and controlling a waveform of the first type of transmitted signal(s) such that the waveform of the first type of transmitted signal(s) comprises a train of pulses. Each pulse is separated in time by a pulse separation time. Each pulse includes a series of chirps. According to this aspect, frequencies of each chirp vary according to a predetermined function of frequency versus time, wherein the pulse separation time between at least two pulses is varied randomly. The method also includes steps of receiving a reflected signal generated by reflection of the transmitted signal from an object and generating a receive signal from the reflected signal, and receiving the receive signal and processing the receive signal to generate radar information for the region.

In some embodiments, according to this aspect, the radar processing method also includes steps of transmitting a second type of transmitted signal into the region, and controlling a second waveform of the second type of transmitted signal(s) such that the second waveform of the second type of transmitted signal(s) includes a second train of pulses. Each pulse of the second train of pulses is separated in time by a second pulse separation time. Each pulse of the second train of pulses includes a second series of chirps. Frequencies of chirps of the second plurality of chirps vary according to the predetermined function of frequency versus time. The first waveform of the first type of transmitted signal is controlled such that the frequencies of each chirp of the plurality of chirps vary one of directly and inversely with time, and the second waveform of the second type of transmitted signal is controlled such that the frequencies of each chirp of the second plurality of chirps vary the other of directly and inversely with time.

In some embodiments, according to this aspect of the present disclosure, the radar processing method also includes steps of transmitting the first type of transmitted signal from at least one first transmitter on a vehicle, and transmitting the second type of transmitted signal from at least one second transmitter on the vehicle, wherein the first transmitter(s) and the second transmitter(s) are mounted around the vehicle in an alternating pattern such that each first transmitter is adjacent to a second transmitter and not adjacent to another first transmitter.

In some embodiments, according to this aspect, the predetermined function is a substantially linear sloped ramp function of frequency versus time.

A radar processing method, according to another aspect of the present disclosure includes steps of transmitting a first type transmitted signal into a region and controlling a waveform of the first type of transmitted signal(s) such that the waveform of the first type of transmitted signal(s) comprises a train of pulses. Each pulse is separated in time by a pulse separation time. Each pulse includes a series of chirps. Frequencies of each chirp varying according to a predetermined function of frequency versus time. According to this aspect, a range of frequencies in at least one chirp is varied randomly. The method also includes steps of receiving a reflected signal generated by reflection of the transmitted signal from an object and generating a receive signal from the reflected signal, and receiving the receive signal and processing the receive signal to generate radar information for the region.

In some embodiments, according to this aspect of the present disclosure, the radar processing method also includes steps of transmitting a second type of transmitted signal into the region, and controlling a second waveform of the second type of transmitted signal(s) such that the second waveform of the second type of transmitted signal(s) comprises a second train of pulses. Each pulse of the second plurality of pulses being separated in time by a second pulse separation time. Each pulse of the second train of pulses includes a second series of chirps. Frequencies of chirps of the second plurality of chirps vary according to the predetermined function of frequency versus time. The first waveform of the first type of transmitted signal is controlled such that the frequencies of each chirp of the plurality of chirps vary one of directly and inversely with time, and the second waveform of the second type of transmitted signal is controlled such that the frequencies of each chirp of the second plurality of chirps vary the other of directly and inversely with time.

In some embodiments, according to this aspect of the present disclosure, the radar processing method also includes steps of transmitting the first type of transmitted signal from at least one first transmitter on a vehicle, and transmitting the second type of transmitted signal from at least one second transmitter on the vehicle, wherein the first transmitter(s) and the second transmitter(s) are mounted around the vehicle in an alternating pattern such that each first transmitter is adjacent to a second transmitter and not adjacent to another first transmitter.

In some embodiments, according to this aspect, the predetermined function is a substantially linear sloped ramp function of frequency versus time.

It should be understood that, due to the self-referential nature of the mixers, 28, 29 (FIG. 1) in the disclosed radar system, most steps of the interference mitigation methods described herein can be implemented in front-end components of the radar system, e.g., RF signal generator 24, radar transmit circuitry 20, radar receive circuitry 22 and phase shifter circuitry 26, and can be invisible to signal processing components of the radar system, e.g., filtering circuitry 32 analog-to-digital converter circuitry 34 and digital signal processor 36.

Whereas many alterations and modifications of the disclosure will no doubt become apparent to a person of ordinary skill in the art after having read the foregoing description, it is to be understood that the particular embodiments shown and described by way of illustration are in no way intended to be considered limiting. Further, the subject matter has been described with reference to particular embodiments, but variations within the spirit and scope of the disclosure will occur to those skilled in the art. It is noted that the foregoing examples have been provided merely for the purpose of explanation and are in no way to be construed as limiting of the present disclosure.

While the present inventive concept has been particularly shown and described with reference to exemplary embodiments thereof, it will be understood by those of ordinary skill in the art that various changes in form and details may be made therein without departing from the spirit and scope of the present inventive concept as defined by the following claims.

The invention claimed is:

1. A radar system, comprising:
   at least one first signal transmitter for transmitting a first type of transmitted signal into a region; and
   at least one first waveform generator for controlling a waveform of the first type of transmitted signal such that the waveform of the first type of transmitted signal comprises a plurality of pulses, adjacent pulses being separated in time by a pulse separation time, each pulse comprising a plurality of chirps, frequencies of each chirp varying according to a substantially linear sloped ramp of frequency versus time, the first waveform generator(s) controlling the waveform such that the pulse separation time between at least two pulses is varied randomly and a range of frequencies in at least one chirp is varied randomly.

2. The radar system of claim 1, comprising:
   a receiver for receiving a reflected signal generated by reflection of the transmitted signal from an object and generating a receive signal from the reflected signal; and
   a processor for receiving the receive signal and processing the receive signal to generate radar information for the region.

3. The radar system of claim 2, comprising:
   at least one second transmitter for transmitting a second type of transmitted signal into the region.

4. The radar system of claim 3, comprising:
   at least one second waveform generator for controlling a second waveform of the second type transmitted signal such that the second waveform of the second type of transmitted signal comprises a second plurality of pulses, each pulse of the second plurality of pulses being separated in time by a second pulse separation time, each pulse of the second plurality of pulses comprising a second plurality of chirps, frequencies of chirps of the second plurality of chirps varying according to a substantially linear sloped ramp of frequency versus time.

5. The radar system of claim 4, wherein:
   the first waveform generator(s) controls the first waveform(s) of the first type of transmitted signal(s) such that the frequencies of each chirp of the plurality of chirps vary one of directly and inversely with time; and
   the second waveform generator(s) controls the second waveform(s) of the second transmitted signal(s) such that the frequencies of each chirp of the second plurality of chirps vary the other of directly and inversely with time.

6. The radar system of claim 5, wherein the at least one first transmitter(s) and the at least one second transmitter(s) are mounted around a vehicle in an alternating pattern such that each first transmitter is adjacent to a second transmitter and not adjacent to another first transmitter.

7. A radar system, comprising:
   at least one first signal transmitter for transmitting a first type transmitted signal into a region; and
   at least one waveform generator for controlling a waveform of the first type of transmitted signal(s) such that the waveform of the first type of transmitted signal(s) comprises a plurality of pulses, adjacent pulses being separated in time by a pulse separation time, each pulse comprising a plurality of chirps, frequencies of each chirp varying according to a predetermined function of frequency versus time, the waveform generator controlling the waveform such that the pulse separation time between at least two pulses is varied randomly.

8. The radar system of claim 7, comprising:
   a receiver for receiving a reflected signal generated by reflection of the transmitted signal from an object and generating a receive signal from the reflected signal; and
   a processor for receiving the receive signal and processing the receive signal to generate radar information for the region.

9. The radar system of claim 8, comprising:
   at least one second transmitter for transmitting a second type of transmitted signal into the region.

10. The radar system of claim 9, comprising:
    at least one second waveform generator for controlling a second waveform of the second type of transmitted signal(s) such that the second waveform of the second type of transmitted signal(s) comprises a second plurality of pulses, each pulse of the second plurality of pulses being separated in time by a second pulse separation time, each pulse of the second plurality of pulses comprising a second plurality of chirps, frequencies of chirps of the second plurality of chirps varying according to the predetermined function of frequency versus time.

11. The radar system of claim 10, wherein:
    the first waveform generator(s) controls the first waveform of the first type of transmitted signal such that the frequencies of each chirp of the plurality of chirps vary one of directly and inversely with time; and
    the second waveform generator(s) controls the second waveform of the second type of transmitted signal such that the frequencies of each chirp of the second plurality of chirps vary the other of directly and inversely with time.

12. The radar system of claim 11, wherein the radar system is an automotive radar system and wherein at least one first transmitter(s) and the at least one second transmitter(s) are mounted around a vehicle in an alternating pattern such that each first transmitter is adjacent to a second transmitter and not adjacent to another first transmitter.

13. The radar system of claim 7, wherein the predetermined function is a substantially linear sloped ramp function of frequency versus time.

14. A radar system, comprising:
    at least one first signal transmitter for transmitting a first type transmitted signal into a region;
    at least one waveform generator for controlling a waveform of the first type of transmitted signal(s) such that the waveform of the first type of transmitted signal(s) comprises a plurality of pulses, adjacent pulses being separated in time by a pulse separation time, each pulse comprising a plurality of chirps, frequencies of each chirp varying according to a predetermined function of frequency versus time, the waveform generator controlling the waveform such that a range of frequencies in at least one chirp is varied randomly and such that the pulse separation time between at least two pulses is varied randomly.

15. The radar system of claim 14, comprising:
    a receiver for receiving a reflected signal generated by reflection of the transmitted signal from an object and generating a receive signal from the reflected signal; and a processor for receiving the receive signal and processing the receive signal to generate radar information for the region.

16. The radar system of claim 15, comprising:

at least one second transmitter for transmitting a second type of transmitted signal into the region.

17. The radar system of claim 16, comprising:

at least one second waveform generator for controlling a second waveform of the second type of transmitted signal(s) such that the second waveform of the second type of transmitted signal(s) comprises a second plurality of pulses, each pulse of the second plurality of pulses being separated in time by a second pulse separation time, each pulse of the second plurality of pulses comprising a second plurality of chirps, frequencies of chirps of the second plurality of chirps varying according to the predetermined function of frequency versus time.

18. The radar system of claim 17, wherein:

the first waveform generator(s) controls the first waveform of the first type of transmitted signal such that the frequencies of each chirp of the plurality of chirps vary one of directly and inversely with time; and the second waveform generator(s) controls the second waveform of the second type of transmitted signal such that the frequencies of each chirp of the second plurality of chirps vary the other of directly and inversely with time.

19. The radar system of claim 18, wherein the radar system is an automotive radar system and wherein at least one first transmitter(s) and the at least one second transmitter(s) are mounted around a vehicle in an alternating pattern such that each first transmitter is adjacent to a second transmitter and not adjacent to another first transmitter.

20. The radar system of claim 14 wherein the predetermined function is a substantially linear sloped ramp function of frequency versus time.

* * * * *